United States Patent
Amin-Shahidi et al.

(10) Patent No.: US 10,431,261 B2
(45) Date of Patent: Oct. 1, 2019

(54) FLEXIBLE-MOUNT ELECTRICAL CONNECTION

(71) Applicant: Western Digital Technologies, Inc., San Jose, CA (US)

(72) Inventors: Darya Amin-Shahidi, San Jose, CA (US); Toshiki Hirano, San Jose, CA (US); Lidu Huang, Danville, CA (US); Todd McNally, Peyton, CO (US); Jeff Wilke, Palmer Lake, CO (US)

(73) Assignee: Western Digital Technologies, Inc, San Jose, CA (US)

( * ) Notice: Subject to any disclaimer, the term of this patent is extended or adjusted under 35 U.S.C. 154(b) by 0 days.

(21) Appl. No.: 15/627,632

(22) Filed: Jun. 20, 2017

(65) Prior Publication Data
US 2018/0366163 A1 Dec. 20, 2018

(51) Int. Cl.
| | |
|---|---|
| *G06F 1/16* | (2006.01) |
| *H05K 5/00* | (2006.01) |
| *H05K 7/00* | (2006.01) |
| *G11B 33/12* | (2006.01) |
| *G11B 33/08* | (2006.01) |
| *H01R 25/16* | (2006.01) |
| *H01R 33/88* | (2006.01) |
| *H01R 12/70* | (2011.01) |
| *H01R 12/77* | (2011.01) |
| *H01R 12/61* | (2011.01) |
| *G06F 1/18* | (2006.01) |

(Continued)

(52) U.S. Cl.
CPC ............ *G11B 33/122* (2013.01); *G06F 1/187* (2013.01); *G11B 33/08* (2013.01); *G11B 33/126* (2013.01); *G11B 33/128* (2013.01); *H01R 12/613* (2013.01); *H01R 12/7076* (2013.01); *H01R 12/774* (2013.01); *H01R 12/778* (2013.01); *H01R 12/91* (2013.01); *H01R 13/2442* (2013.01); *H01R 25/16* (2013.01); *H01R 33/88* (2013.01)

(58) Field of Classification Search
CPC ........ G06F 1/187; H05K 7/02; H01R 33/965; G11B 33/122
USPC ....... 361/679.33, 679.34; 439/247, 248, 384, 439/82
See application file for complete search history.

(56) References Cited

U.S. PATENT DOCUMENTS

| | | | | |
|---|---|---|---|---|
| 4,850,899 | A | * | 7/1989 | Maynard ................ H01R 31/06 439/628 |
| 5,187,643 | A | * | 2/1993 | I-Shou .................... G06F 1/181 361/679.37 |

(Continued)

*Primary Examiner* — Hae Moon Hyeon (57) ABSTRACT

Provided herein are systems and apparatus for reducing vibration interaction between hard drives. In one implementation, a flexible mount electrical connection comprises a mating connector configured to physically couple with a hard drive connector and a plurality of electrical pins having a connector portion positioned within the mating connector configured to electrically couple with hard drive connector pins positioned within the hard drive connector. Each electrical pin has an extended portion extending away from the mating connector. The extended portion has an attachment portion configured to electrically couple the respective electrical pin to a printed circuit board, and the extended portion has a shape formed therein configured to reduce transmission of vibrations in the connector portion along each axis of a three-dimensional space to the attachment portion.

20 Claims, 13 Drawing Sheets

(51) Int. Cl.
*H01R 12/91* (2011.01)
*H01R 13/24* (2006.01)

(56) References Cited

U.S. PATENT DOCUMENTS

| | | | |
|---|---|---|---|
| 5,201,663 A | 4/1993 | Kikuchi et al. | |
| 6,050,831 A * | 4/2000 | Wu | G06F 1/184 439/638 |
| 6,233,143 B1 * | 5/2001 | Gamble | G11B 33/122 312/332.1 |
| 6,634,909 B2 * | 10/2003 | Lin | G11B 33/122 439/638 |
| 6,764,344 B2 | 7/2004 | Maiers | |
| 6,884,085 B1 | 4/2005 | Goldstone | |
| 7,149,051 B2 | 12/2006 | Yu et al. | |
| 7,163,422 B2 | 1/2007 | Amano et al. | |
| 7,186,126 B2 * | 3/2007 | Umehara | H01R 13/33 439/247 |
| 7,609,511 B2 * | 10/2009 | Peng | G11B 33/128 248/633 |
| 7,701,707 B2 * | 4/2010 | Peng | G11B 33/128 248/618 |
| 7,753,714 B2 * | 7/2010 | Wu | H01R 31/065 361/679.33 |
| 7,753,736 B2 * | 7/2010 | Yang | H01R 13/2442 439/638 |
| 7,862,345 B2 * | 1/2011 | Fukazawa | H01R 12/716 439/74 |
| 7,922,539 B2 * | 4/2011 | Kubo | H01R 13/6315 439/247 |
| 8,248,775 B2 * | 8/2012 | Zhang | G11B 33/124 248/27.1 |
| 8,456,832 B1 * | 6/2013 | Brigham, Jr. | G06F 1/187 361/679.33 |
| 8,749,966 B1 * | 6/2014 | Boudreau | G06F 1/187 361/679.33 |
| 8,821,174 B2 * | 9/2014 | Kimura | H01R 13/6315 439/248 |
| 9,235,020 B2 | 1/2016 | Pitwon | |
| 9,513,677 B2 * | 12/2016 | Huang | G06F 1/187 |
| 9,823,712 B2 * | 11/2017 | Huang | G06F 1/187 |
| 9,870,804 B2 * | 1/2018 | Niss | G11B 33/128 |
| 2003/0030975 A1 * | 2/2003 | Bestwick | G06F 1/183 361/679.51 |
| 2003/0036296 A1 | 2/2003 | Cox et al. | |
| 2007/0008694 A1 | 1/2007 | Yang et al. | |
| 2009/0233490 A1 * | 9/2009 | Chou | H01R 31/065 439/638 |
| 2009/0246990 A1 * | 10/2009 | Yang | H01R 13/6315 439/135 |
| 2010/0062659 A1 | 3/2010 | Yang et al. | |
| 2010/0081333 A1 * | 4/2010 | Yang | H01R 13/2442 439/638 |
| 2010/0120283 A1 * | 5/2010 | Yang | H01R 13/2442 439/357 |
| 2011/0069441 A1 * | 3/2011 | Killen | G11B 33/124 361/679.33 |
| 2015/0268701 A1 * | 9/2015 | Huang | G06F 1/187 361/679.35 |
| 2015/0268702 A1 * | 9/2015 | Huang | G06F 1/187 361/679.35 |
| 2015/0380059 A1 | 12/2015 | Bell et al. | |
| 2016/0219730 A1 * | 7/2016 | Niss | G11B 33/124 |

\* cited by examiner

FLEXIBLE-MOUNT ELECTRICAL CONNECTION

TECHNICAL FIELD

As computer systems and networks grow in numbers and capability, there is a need for more and more storage system capacity. Cloud computing and large-scale data processing further increase the need for digital data storage systems that are capable of transferring and holding immense amounts of data.

One approach to providing sufficient data storage is the use of arrays of independent hard disk drives. A number of hard disk drives can be held in a container, sometimes referred to as a sled. The hard disk drives are held and operated in close proximity within the sled, so that many hard disk drives can be fit into a defined volume. Rackmount enclosures typically hold multiple sleds. Rackmount enclosures can be used to hold very large amounts of data.

Hard disk drives include spinning disks that are typically rotated at high speeds, such as a speed of 7,200 RPM, for example. A read head is moved inward or outward from the center of the spinning disks in order to read and write data on the disk. These moving components can generate vibrations in the hard disk drive. Hard disk drives include traditional hard disk drives and hybrid drives (combination of traditional rotating storage and solid state storage).

When a number of hard disk drives are included within a sled, the vibrations generated by one hard disk drive can be transferred to other hard disk drives within the sled. The transferred vibrations can interfere with operations of the affected hard disk drive or hard disk drives. The transferred vibrations can cause decreased performance or possible damage to components of the hard disk drive.

Overview

A vibration-isolating hard disk drive carrier for isolating the transfer of vibration from one hard disk drive to another comprising a carrier body and one or more isolation hangers is disclosed. The carrier has a first surface configured to couple to inherent features of a first external surface of a hard disk drive, and a second surface configured to couple to inherent features of a second external surface hard disk drive. One or more isolation hangers configured to support the hard disk drive in a vertical orientation are coupled to the carrier body.

In one implementation, a flexible-mount electrical connection comprises a mating connector configured to physically couple with a hard drive connector and a plurality of electrical pins having a connector portion positioned within the mating connector configured to electrically couple with hard drive connector pins positioned within the hard drive connector. Each electrical pin has an extended portion extending away from the mating connector. The extended portion has an attachment portion configured to electrically couple the respective electrical pin to a printed circuit board, and the extended portion has a shape formed therein configured to reduce transmission of vibrations in the connector portion along each axis of a three-dimensional space to the attachment portion.

In another implementation, a vibration-isolating hard disk drive carrier comprises a carrier body having a first surface configured to couple to inherent features of a first external surface of a hard disk drive. The carrier body has a second surface configured to couple to inherent features of a second external surface hard disk drive. One or more isolation hangers are configured to support the hard disk drive in a vertical orientation coupled to the carrier body. A flexible-mount electrical connection comprises an electrical connector configured to physically couple with a hard drive connector of the hard disk drive and comprises a plurality of electrical pins having a connector portion positioned within the electrical connector configured to electrically couple with hard drive connector pins positioned within the hard drive connector. Each electrical pin has an extended portion extending away from the electrical connector. The extended portion has an attachment portion configured to electrically couple the respective electrical pin to a printed circuit board, and the extended portion has a shape formed therein configured to reduce transmission of vibrations in the connector portion along each axis of a three-dimensional space to the attachment portion.

In another implementation, a hanging mounting system for a vibration-isolating hard disk drive carrier comprises a carrier body having a first surface configured to couple to inherent features of a first external surface of a hard disk drive. The carrier body has a second surface configured to couple to inherent features of a second external surface hard disk drive. One or more isolation hangers are configured to support the hard disk drive in a vertical orientation coupled to the carrier body, and one or more drive dividers comprising one or more engagement elements are configured to couple with the one or more isolation hangers of the carrier. A flexible-mount electrical connection comprises a mating connector configured to physically couple with a hard drive connector of the hard disk drive and comprises a plurality of electrical pins having a first portion positioned within the mating connector configured to electrically couple with hard drive connector pins positioned within the hard drive connector, each electrical pin having an extended portion extending away from the mating connector. The extended portion has an attachment end configured to electrically couple the respective electrical pin to a printed circuit board, and the extended portion has a shape formed therein configured to reduce transmission of vibrations in the first portion along each of three orthogonal axes to the attachment end.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

Figure 1:
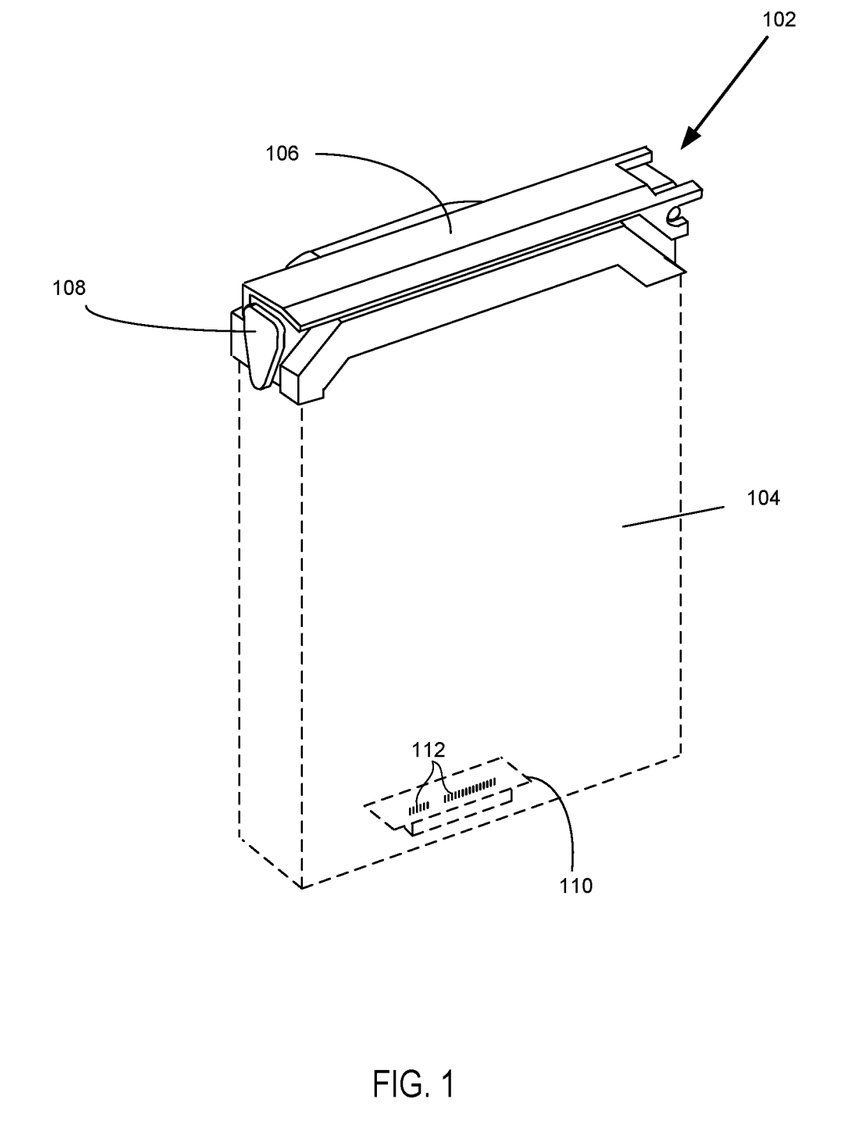
FIG. 1 illustrates a carrier assembly in relation to a hard disk drive.

FIG. 1 illustrates carrier assembly 102 for hard disk drive 104. Carrier assembly 102 comprises carrier body 106 and isolation hanger 108. Hard disk drive 104 and electrical connector are used as a reference to show how carrier assembly 102 functions. Carrier assembly 102 couples to hard disk drive 104. The shape of carrier body 106 may vary depending upon the type of hard disk drive 104 carrier assembly 102 is configured to secure. In one example, carrier assembly 102 may secure hard disk drive 104 by mating with features inherent to the external surfaces of hard disk drive 104. The external surfaces of hard disk drive 104 are not typically smooth. The inherent features discussed herein comprise variations in surface height, recesses, indentations, cavities, impressions, bulges, protrusions, or screw holes among other features. Carrier body 106 when configured to secure hard disk drive 104 by mating with features inherent to the external surfaces of hard disk drive 104 can negate the need for mechanical fasteners (e.g., screws) to secure hard disk drive 104 and thereby negate the need for tools to secure carrier assembly 102 to hard disk drive 104. In another example, carrier assembly 102 may comprise two parts attached by a hinge that open and close in a clamshell fashion encapsulating hard disk drive 104. In another example, carrier body 106 may comprise two independent halves that snap together via interlocking features.

Another inherent feature found on hard disk drive 104 are screw holes. Screw holes are included as part of hard disk drive 104 for traditional mounting. Screw holes are robust and predictable inherent features of hard disk drive 104 because they are often defined by a form factor standard. Fasteners (e.g., screws, bolts) may be used to couple the carrier body 106 to hard disk drive 104 using the inherent screw holes. Alternatively, a plastic dowel may be used to couple hard disk drive 104 to carrier body 106 by pressfitting the dowel into the inherent screw holes. Hard disk drive 104 can be secured by only two screw holes allowing hard disk drive 104 freedom of motion about the axis of the screws.

Carrier assembly 102 comprises one or more isolation hangers 108. Isolation hanger 108 works in conjunction with drive divider 202, 204 of FIG. 2. Isolation hanger 108 isolates hard disk drive 104 from vibration and orients hard disk drive 104 vertically in space against the force of gravity. Hard disk drive 104 has a plane substantially parallel to spinning disk platters contained within. Additionally, hard disk drive 104 has an electrical connector 110 at one end in this example. The electrical connector 110 has connector pins 112 to electrically couple hard disk drive 104 to a host system. In this context, when hard disk drive 104 is said to be hung vertically, the plane substantially parallel to the spinning disk platters is vertical, or perpendicular to the plane of the horizon. On many, but not all hard disk drive 104 examples, electrical connector 110 will face downward when in a vertical orientation.

Figure 2:
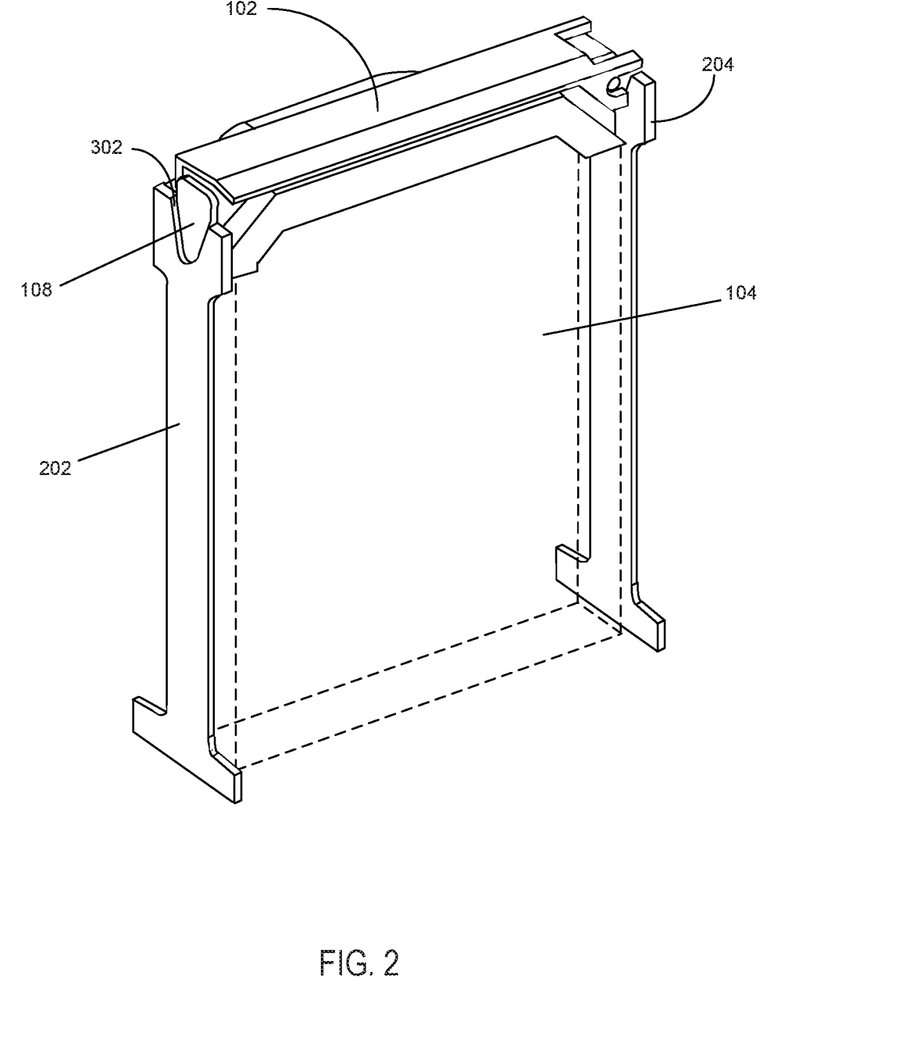
FIG. 2 illustrates a carrier assembly and two drive dividers.

FIG. 2 illustrates how carrier assembly 102, isolation hanger 108, and drive dividers 202,204 work together to hang hard disk drive 104 in a vertical orientation against the force of gravity. It should be noted that in this example, engagement element 302 does not prevent carrier assembly 102 coupled to hard disk drive 104 from moving in up and down in the vertical direction against gravity, thereby helping to isolate vibration. In some examples, drive dividers 202, 204 feature one or more engagement elements 302 configured to mate with isolation hanger 108. In some examples, drive dividers 202,204 have more than one engagement element 302 providing the capability for drive dividers 202,204 to hold more than one carrier assembly 102 and hard disk drive 104.

Figure 3:
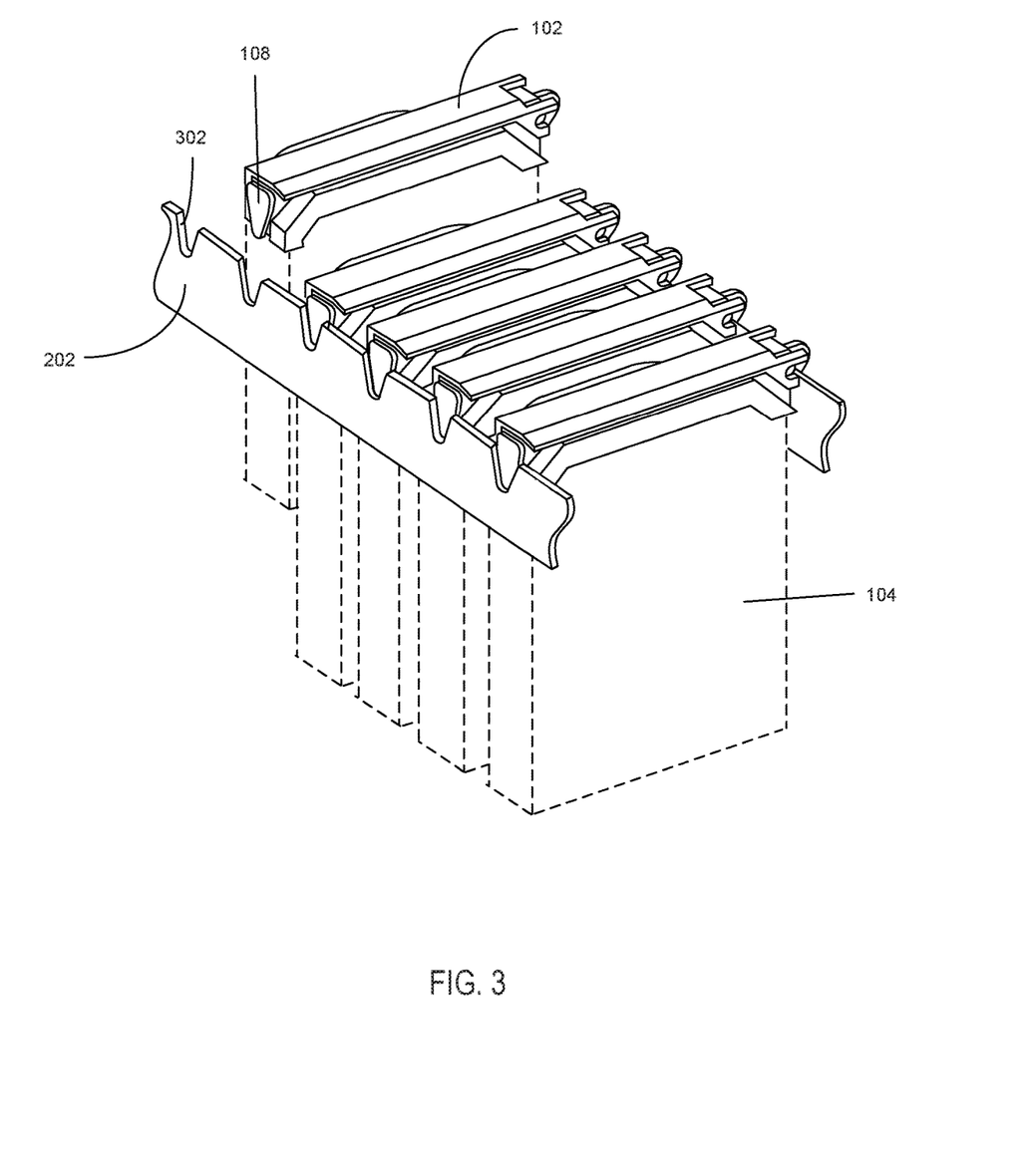
FIG. 3 illustrates a drive divider configured to hold multiple carrier assemblies.

FIG. 3 illustrates another exemplary configuration for drive dividers 202,204. Drive dividers 202,204 comprise multiple engagement elements 302 enabling drive dividers 202,204 to support a plurality of carrier assemblies 102 and hard disk drives 104. In one example, drive dividers 202,204 are integral to the wall of a sled. In another example, drive dividers 202,204 are contained within a rackmount enclosure without the need for a sled. In yet another example, drive dividers 202,204 may be configured to hang carrier assembly 102 and hard disk drive 104 in a room without a sled or a rackmount enclosure. Drive dividers 202,204 and carrier assembly 102 may be used independently of any other structure or technology to hold a large array of independent hard disk drives 104. Drive dividers 202,204 may be very large and capable of holding hundreds of hard disk drives 104.

Figure 4:
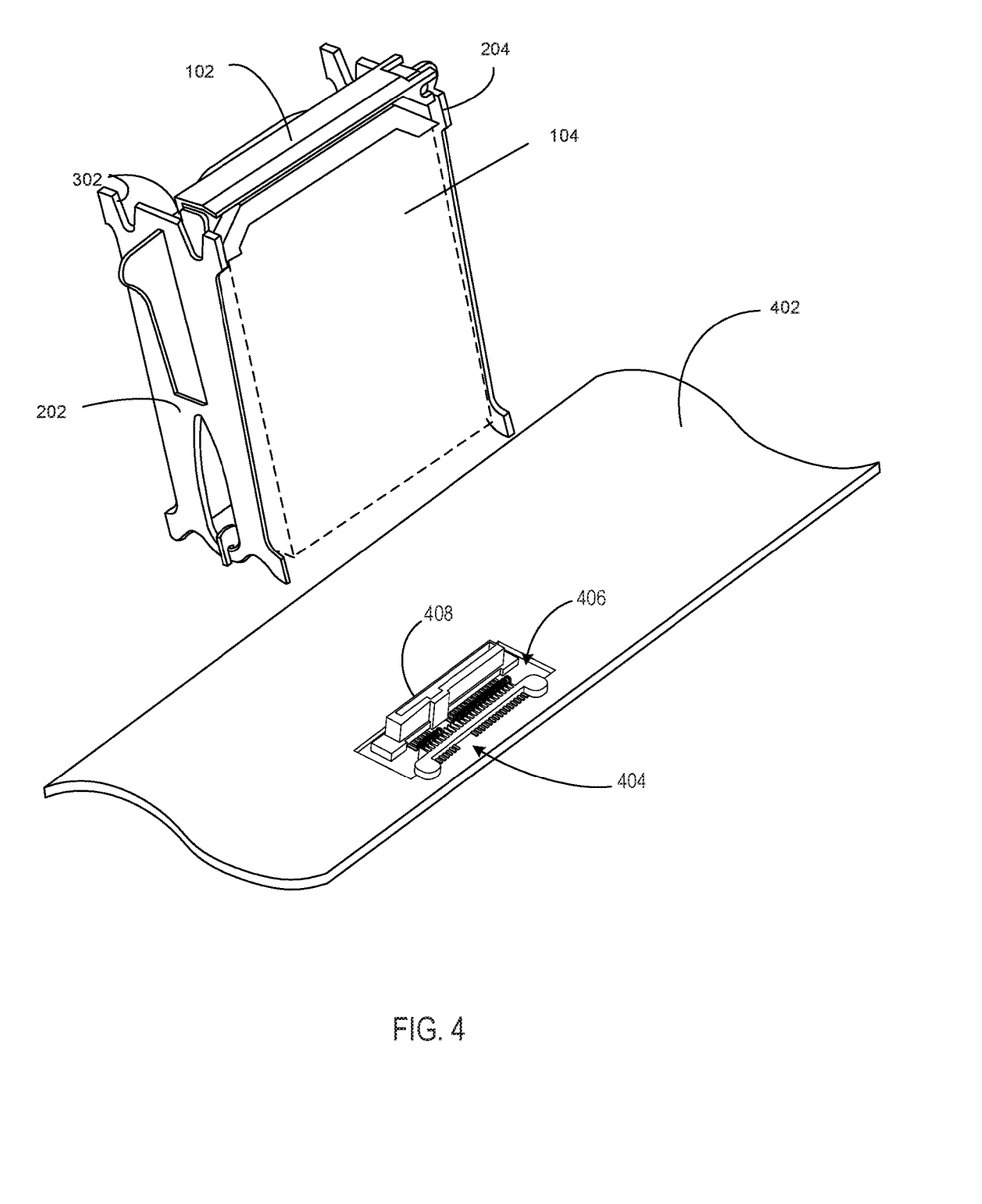
FIG. 4 illustrates a hard disk drive carrier, drive dividers and a flexible-mount electrical connection according to an embodiment of the invention.

FIG. 4 illustrates carrier assembly 102, hard disk drive 104, engagement element 302 and drive dividers 202,204 configured to couple hard disk drive 104 with. FIG. 4 further illustrates by way of example how drive dividers 202,204 and carrier assembly 102 may be designed to hold hard disk drive 104 in a position convenient to couple electrical connector 110 to flexible-mount electrical connection 404. Vibration transmission between multiple hard disk drives 104 is prevented by a combination of isolation hangers 108 and flexible-mount electrical connection 404. Flexible-mount electrical connection 404 is flexible enough to prevent the transfer of vibration to and from nearby hard disk drives 104.

FIG. 4 illustrates an example of carrier assembly 102, hard disk drive 104, engagement element 302, and drive dividers 202, 204 configured to couple hard disk drive 104 to a printed circuit board (PCB) backplane 402. In the example provided in FIG. 4, a flexible-mount electrical connection 404 is attached to PCB backplane 402 adjacently to a removed section or void 406, which allows a connector 408 of flexible-mount electrical connection 404 to be suspended over the void 406 in the PCB backplane 402. In one embodiment, connector 408 is a SAS connector (i.e., Serial Attached Small Computer System Interface connector). However, other configurations of connector 408 is contemplated herein for allowing connections to the type of electrical connector 110 used by the hard disk drives 104 to be used. Carrier assembly 102, isolation hanger 108, and drive dividers 202,204 may be configured to position hard disk drive 104 in relation to PCB backplane 402 such that hard disk drive 104 can mechanically couple to flexible-mount electrical connection 404. PCB backplane 402 may comprise a plurality of flexible-mount electrical connections 404, a plurality of drive dividers 202,204 and a plurality of carrier assemblies 102 to mount an array of independent hard disk drives 104.

The example in FIG. 4 illustrates carrier assembly 102 and hard disk drive 104 having only three points of contact. Carrier body 106 contacts two different points: one point of contact to first drive divider 202 and a second point of contact to second drive divider 204. Vibration transmission to these contact points is mitigated by isolation hangers 108. The contact with flexible-mount electrical connection 404 by hard disk drive 104 makes the third point of contact. As described herein, vibration transmission between the PCB backplane 402 and the hard disk drive 104 is isolated by the unique design of the flexible-mount electrical connection 404.

In this example, the flexible-mount electrical connection 404 flexes, thereby preventing hard disk drive 104 from transmitting vibration through connector 408 to PCB backplane 402. Alternatively, flexible-mount electrical connection 404 prevents vibration transmission from PCB backplane 402 through electrical connector 408 to hard disk drive 104.

Figure 5:
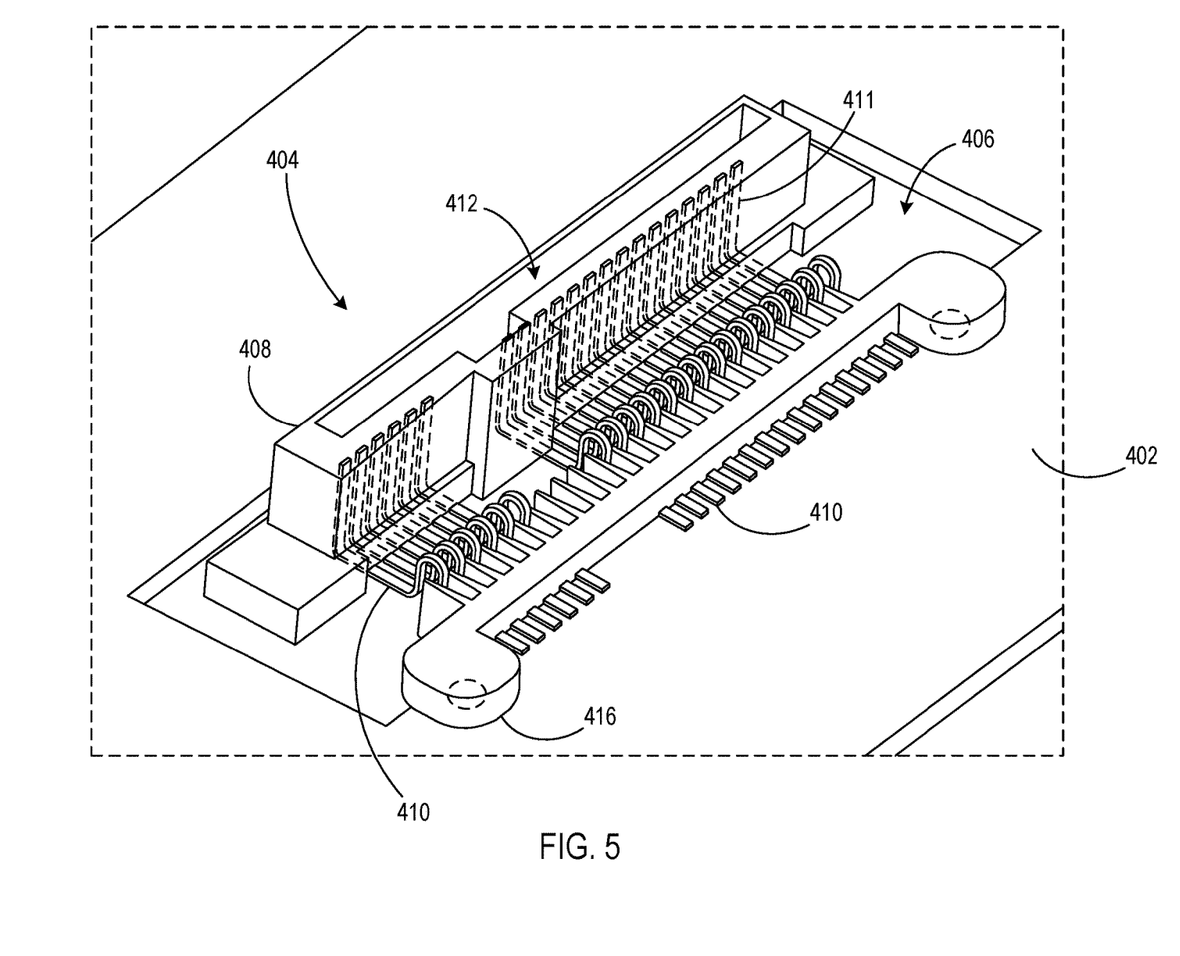
FIGS. 5-8 illustrate the flexible-mount electrical connection of FIG. 4 according to an embodiment of the invention.

FIGS. 5-8 illustrate the flexible-mount electrical connection 404 and portions thereof. As shown in FIG. 5, connector 408 is attached via pins 410 to PCB backplane 402. On one end, a connector portion 411 of pins 410 extends into a cavity 412 of pin 410 into which electrical connector 110 is inserted. Pins 410 are thus allowed to be electrically connected to the pins in electrical connector 110. An extended portion 413 of pins 410 extending from connector 408 extends toward the PCB backplane 402, and an attachment portion 415 of an end of the extending portion 413 is electrically attached to contact pads 414 of PCB backplane 402 in one embodiment. In this manner, pins 410 are physically and electrically coupled with the PCB backplane 402, and connector 408 is suspended over the void 406 in the PCB backplane 402. As such, connector 408 is coupled to PCB backplane 402 via pins 410, but it does not physically touch the PCB backplane 402.

Figure 6:
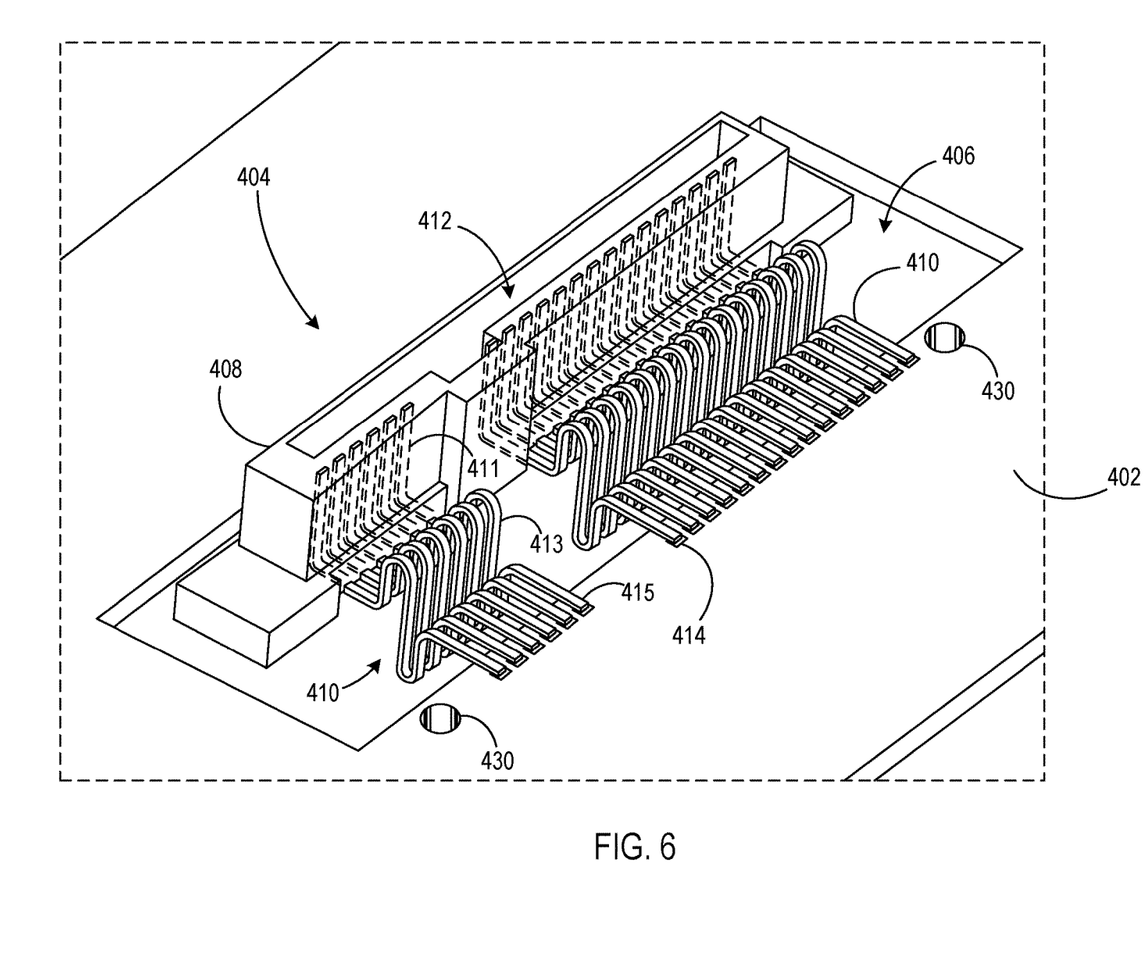
Figure 7:
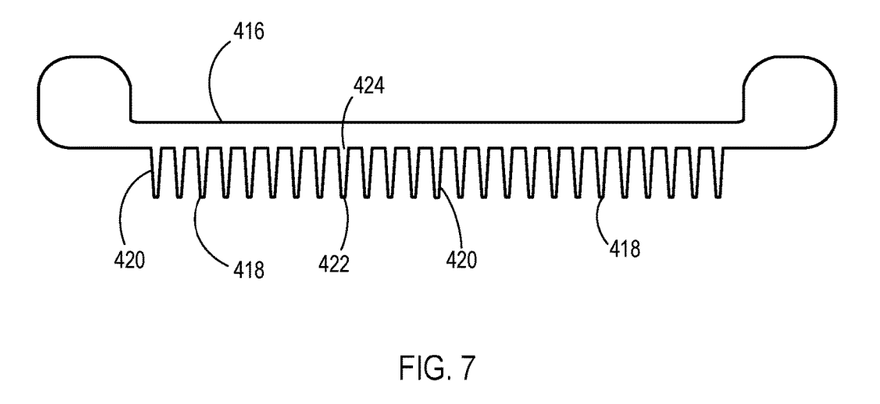

Referring to FIGS. 5 and 6, pins 410 are formed to be sufficiently rigid to suspend connector over void 406 and to also be flexible enough to allow connector 408 to flex and have some movement in three-dimensional space to isolate vibrations in connector 408 from PCB backplane 402. As illustrated, pins 410 have a shape formed therein to allow the flexibility in each of the three dimensions. In the example shown, an inverted "S" shape is formed therein. The shape illustrated is, however, by way of example only, and other shapes that allow three-dimensional flexibility are within the scope of embodiments of the disclosure herein.

Figure 9:
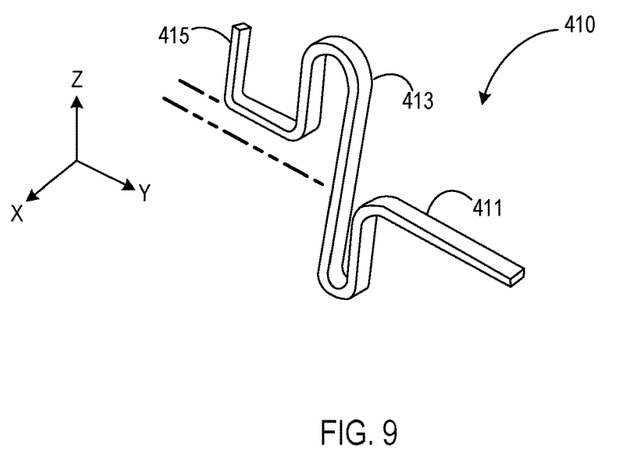
FIGS. 9-11 illustrate flexure of connector pins of flexible-mount electrical connection of FIG. 4 in three-dimensional space according to an embodiment of the invention.
Figure 10:
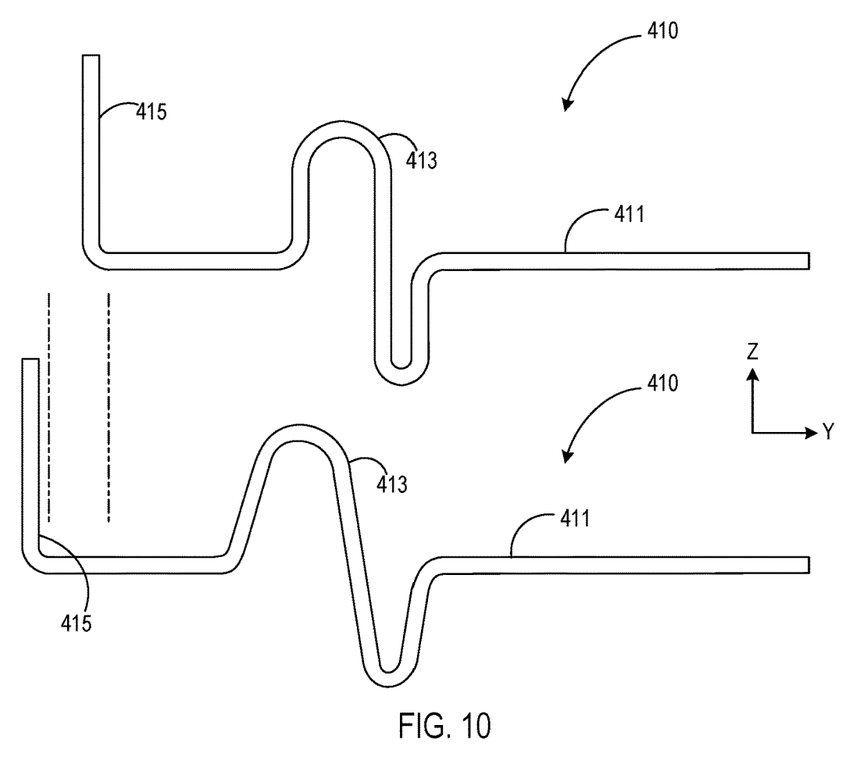
Figure 11:
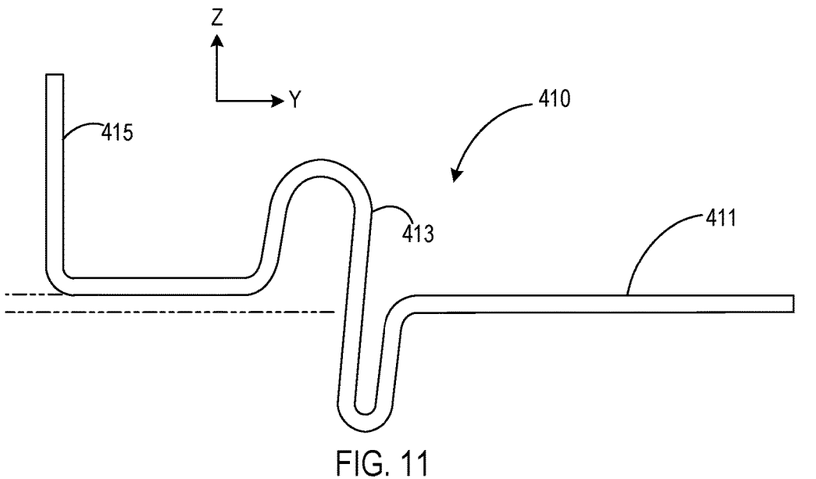

FIGS. 9-11 illustrate flexure of pins 410 along a first ("X") axis, a second ("Y") axis, and a third ("Z") axis, the axes being orthogonal to each other. The shape and form of pin 410 allows movement of connector 408 at one end of pin 410 (caused by vibrations of the hard disk drive 104 to which it attached) along any single or multiple combination of these axes to have a reduced effect of such movement at the other end of the pin 410. In this manner, isolation of a portion of the vibrations of hard disk drive 104 is achieved.

Referring back to FIG. 5, pin separator or collimator 416 is attached to PCB backplane 402 and positioned to separate pins 410 and to help prevent two or more pins 410 from coming into electrical contact with each other as movement of the connector 408 bends and flexes pins 410. The collimator 416 is preferably formed of an electrically resistive material to prevent electrical connection of pins 410 together through physical contact with the collimator 416 Referring as well to FIGS. 7 and 8, collimator 416 includes a plurality of teeth 418 positioned to be aligned with gaps between pins 410. In one embodiment, teeth 418 have side walls 420 to allow some freedom of sideways movement of the pins 418 (e.g., along the X axis shown in FIG. 9) before coming into contact with the teeth 418. In this manner, slight movements of pins 410 toward teeth 418 allow pins 410 to flex normally while a much larger movement that causes pins 410 to come into contact with teeth 418 may cause an undesirable deformation to the shape of the pins 410 such as a crease or bend. In one embodiment, the side walls 420 are tapered such that a thinner end 422 of the tooth 418 extends toward connector 408 while a base of the tooth 418 adjacent to a body 424 of collimator 416 is thicker than end 422.

Figure 8:
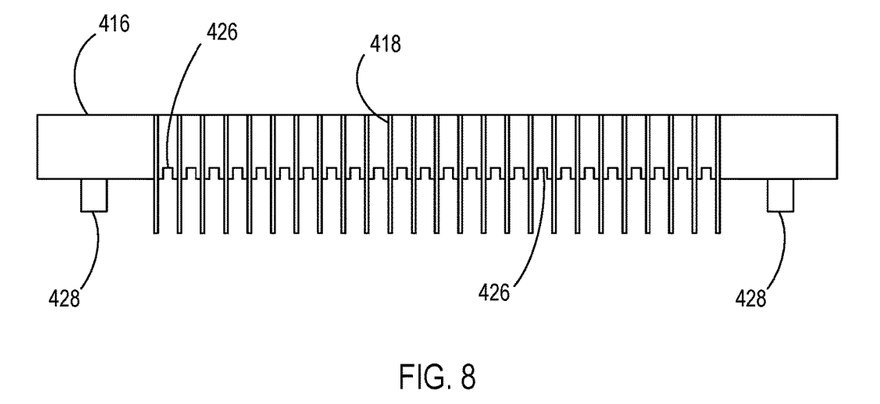

As shown in FIG. 8, a plurality of grooves 426 may also be formed in a bottom of collimator 416 to allow the end of pins 410 attached to PCB backplane 402 to pass therethrough and to be further physically supported in their mechanical and electrical attachments to PCB backplane 402. One or more alignment pins 428 may also be formed in collimator 416 to position the collimator 416 in its predetermined position on the PCB backplane 402 with respect to alignment holes 430.

Figure 12A:
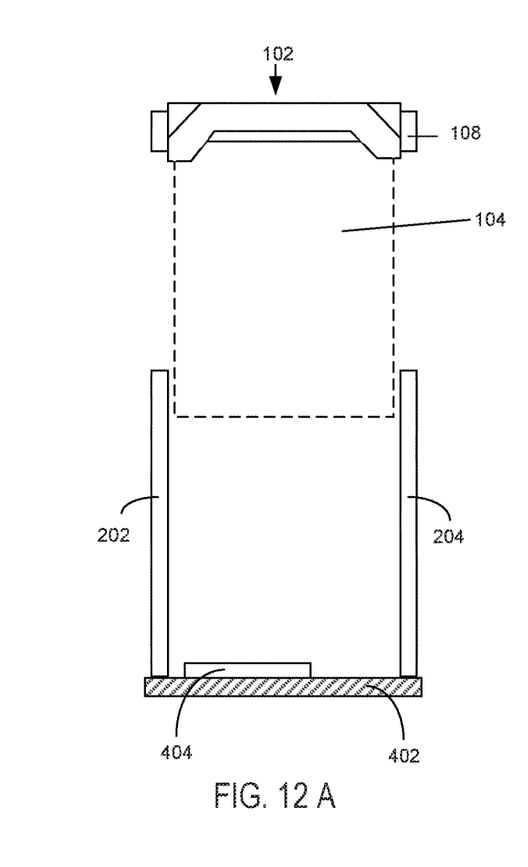
FIGS. 12A-12C illustrate the installation of a hard disk drive to a PCB backplane.
Figure 12B:
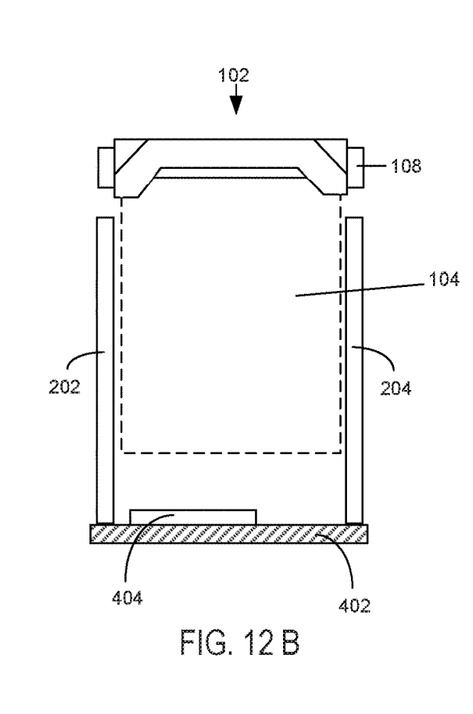
Figure 12C:
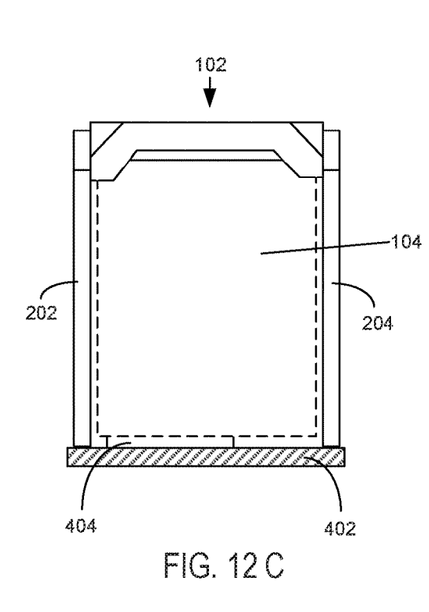

FIG. 12 illustrates, by way of example, how hard disk drive 104 and carrier assembly 102 are installed onto PCB backplane 402. FIG. 12A illustrates the initial insertion of carrier assembly 102 and hard disk drive 104 between two drive dividers 202, 204. In this example, flexible-mount electrical connection 404 is coupled to PCB backplane 402 as described herein. FIG. 12B further illustrates the insertion process of carrier assembly 102 and hard disk drive 104. FIG. 12C illustrates hard disk drive 104 installed to PCB backplane 402 and electrically coupled to flexible-mount electrical connection 404.

Figure 13:
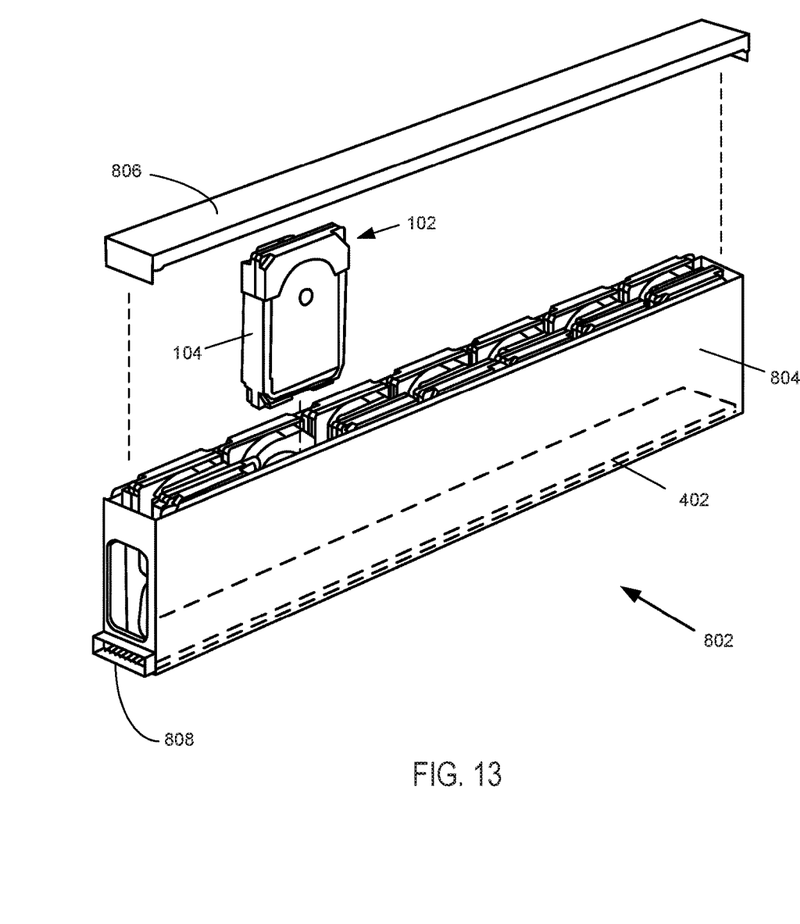
FIGS. 13-14 illustrate sleds containing multiple carrier assemblies and hard disk drives.

FIG. 13 illustrates an example of sled 802 comprising PCB backplane 402, a wall 804, a top cover 806, a sled electrical connector 808, carrier assembly 102, hard disk drive 104 and a plurality of hard disk drives. Sled 802 is a modular unit that holds and operates an array of independent hard disk drives 104. Sled 802 holds a plurality of hard disk drives 104 in close proximity, so that many hard disk drives 104 can be fit into a defined volume. Sled electrical connector 808 electrically couples multiple hard disk drives 104 via PCB backplane 402 a rackmount enclosure. Sled 802 comprises fans or other cooling devices. Multiple sled enclosures 802 may be installed in rackmount enclosures or other support structures. In some examples, as illustrated in FIG. 13, hard disk drives 104 may be mounted parallel to wall 804 of sled 802.

Figure 14:
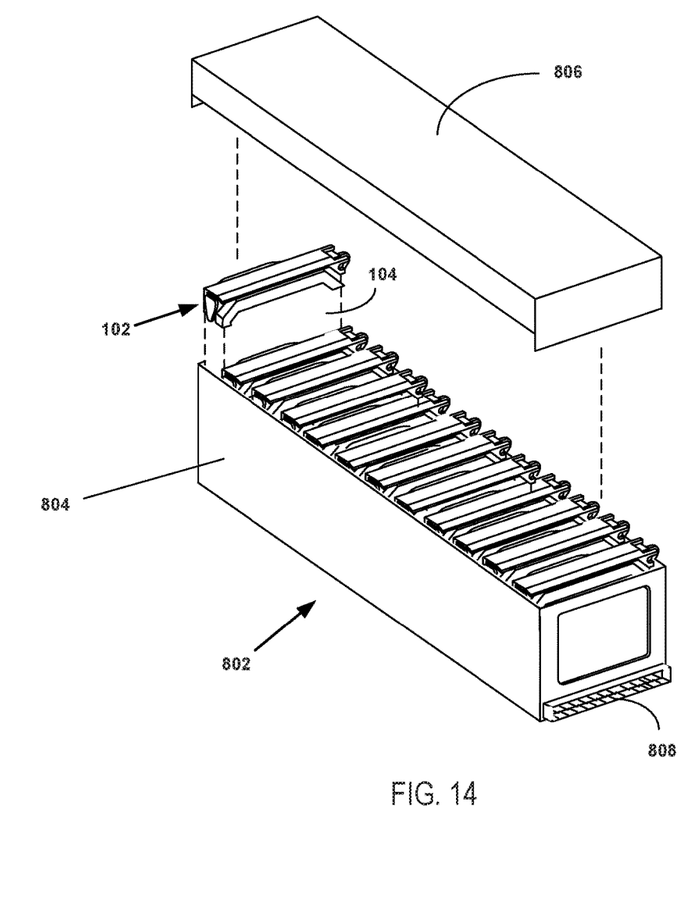

FIG. 14 illustrates an alternate example of sled 802 comprising wall 804, top cover 806, sled electrical connector, carrier assembly 102 and a plurality of hard disk drives 104. In this example, hard disk drives 104 are mounted perpendicular to wall 804 of sled 802. This example is particularly suitable for the example of drive divider 202 illustrated in FIG. 3. In one example, drive dividers 202,204 can be integral to wall 804 of sled 802. In another example, drive dividers 202,204 can be independent of wall 804. Sled 802 has sled electrical connector 808 capable of connecting sled to external devices such as rackmount enclosures.

Figure 15:
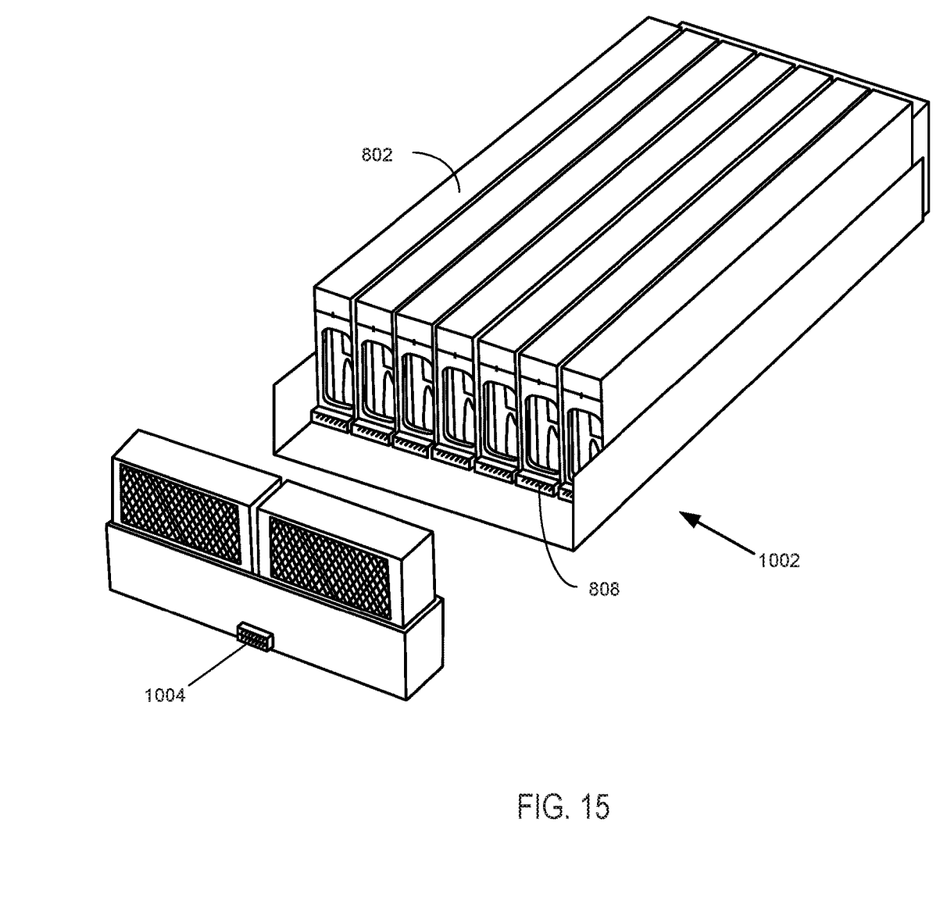
FIG. 15 illustrates a rackmount enclosure.

FIG. 15 illustrates one example of a rackmount enclosure 1002 comprising sleds 802, sled electrical connectors 808, a rackmount electrical connector 1004, and a plurality of hard disk drives. Rackmount enclosure 1002 may electrically couple to a plurality of sleds 802 via sled electrical connectors 808. Sleds 802 may be quickly and easily installed to (or removed from) rackmount enclosure 1002. Rackmount enclosure 1002 may electrically couple to other devices via rackmount electrical connector 1004. In another example, rackmount enclosure 1002 comprises drive dividers 202,204 carrier assembly 102 and hard disk drive 104 without sleds 802. In one example, rackmount enclosure 1002 holds ninety-eight hard disk drives 104, although a different number is possible. Rackmount enclosure 1002 may contain additional items, including but not limited to electronics, power supply systems and cooling systems.

In most examples, carrier assemblies 102, drive dividers 202,204 and hard disk drives 104 will used by the hundreds or thousands. The more hard disk drives 104 that are operating in close proximity to one another, the more vibration is generated and potentially transferred. In many examples, carrier assemblies 102, drive dividers 202,204 and hard disk drives are contained in a sled 802. In other examples, rackmount enclosure 1002 contains multiple sleds 802 containing multiple carrier assemblies 102, drive dividers 202,204, and hard disk drives 104. Other examples comprise hundreds or thousands of carrier assemblies 102, drive dividers 202,204 and hard disk drives 104 may be contained in rackmount enclosure 1002 that does not include sleds 802.

While the examples provided herein have been particularly shown and described with reference to the preferred implementations, it will be understood by those skilled in the art that various changes in form and detail can be made without departing from the spirit and scope of the idea. For example, the main idea is for each hard disk drive 104 to float within an enclosure. This is accomplished by attaching electrical connectors 110 of hard disk drives 104 to flexible-mount electrical connections 404 in PCB backplane 402. The hard disk drives 104 are enclosed by carrier assembly 102 that hangs from drive dividers 202,204. Hard disk drives 104 will have linear and rotational vibration that will be damped by flexible-mount electrical connections 404 and isolation hangers 108 integral to carrier assembly 102. Accordingly, the examples provided herein are to be considered merely as illustrative and limited in scope only as specified in the appended claims.

What is claimed is:

1. A flexible-mount electrical connection comprising:
    a mating connector configured to physically couple with a hard drive connector; and
    a plurality of electrical pins that suspend the mating connector over a void in a printed circuit board (PCB), each electrical pin having:
        a connector portion positioned within the mating connector configured to electrically couple with hard drive connector pins positioned within the hard drive connector; and
        an extended portion extending externally away from the mating connector, the extended portion having:
            an attachment portion configured to electrically couple the electrical pin to the PCB; and
            a curved shape formed therein configured to reduce transmission of vibrations in the connector portion along each axis of a three-dimensional space to the attachment portion.

2. The flexible-mount electrical connection of claim 1, further comprising:
    a pin separator positioned adjacently to the plurality of electrical pins and configured to prevent electrical contact between adjacent electrical pins of the plurality of electrical pins.

3. The flexible-mount electrical connection of claim 2, wherein the pin separator comprises a plurality of teeth, each tooth extending into a space between adjacent electrical pins of the plurality of electrical pins.

4. The flexible-mount electrical connection of claim 3, wherein each tooth of the plurality of teeth comprises a pair of walls tapering from an end thereof toward a body of the pin separator.

5. The flexible-mount electrical connection of claim 3, wherein the pin separator further comprises an alignment pin configured to align the pin separator with respect to the PCB.

6. The flexible-mount electrical connection of claim 1, wherein the curved shape is configured to isolate motions in the connector portion from the attachment portion.

7. The flexible-mount electrical connection of claim 1, wherein the curved shape comprises an "S" shape.

8. A vibration-isolating hard disk drive carrier, comprising:
    a carrier body;
    one or more isolation hangers coupled to the carrier body and configured to support the hard disk drive in a vertical orientation; and
    a flexible-mount electrical connection comprising:
        an electrical connector configured to physically couple with a hard drive connector of the hard disk drive;
        a plurality of electrical pins that suspend the electrical connector over a void in a printed circuit board (PCB), the plurality of electrical pins having a connector portion positioned within the electrical connector configured to electrically couple with hard drive connector pins positioned within the hard drive connector, each electrical pin having an extended portion extending externally away from the electrical connector, the extended portion having:
            an attachment portion configured to electrically couple the electrical pin to the PCB;
            ; and
            a curved shape configured to reduce transmission of vibrations in the connector portion along each axis of a three-dimensional space to the attachment portion.

9. The vibration-isolating hard disk drive carrier of claim 8, wherein an assembly formed of the carrier body, the one or more isolation hangers, and the hard disk drive is supportable in a sled only by way of:
    a first isolation hanger of the one or more isolation hangers of the assembly in contact with a first drive divider positioned within the sled;
    a second isolation hanger of the one or more isolation hangers of the assembly in contact with a second drive divider positioned within the sled; and
    a physical coupling of the hard drive connector of the hard disk drive of the assembly with the flexible-mount electrical connection.

10. The vibration-isolating hard disk drive carrier of claim 8, wherein the flexible-mount electrical connection further comprises a pin collimator positioned adjacently to the plurality of electrical pins and configured to prevent electrical contact between adjacent electrical pins of the plurality of electrical pins.

11. The vibration-isolating hard disk drive carrier of claim 10, wherein the pin collimator comprises a plurality of teeth, each tooth extending into a space between adjacent electrical pins of the plurality of electrical pins.

12. The vibration-isolating hard disk drive carrier of claim 11, wherein each tooth of the plurality of teeth comprises a pair of walls tapering from an end thereof toward a body of the pin collimator.

13. The vibration-isolating hard disk drive carrier of claim 8, wherein the curved shape is configured to isolate motions in the connector portion from the attachment portion.

14. A hanging mounting system for a vibration-isolating hard disk drive carrier comprising:
    a carrier body;
    one or more isolation hangers coupled to the carrier body and configured to support the hard disk drive in a vertical orientation;
    one or more drive dividers comprising one or more engagement elements configured to couple with the one or more isolation hangers; and
    a flexible-mount electrical connection comprising:
        a mating connector configured to physically couple with a hard drive connector of the hard disk drive; and a plurality of electrical pins that suspend the mating connector over a void in a printed circuit board (PCB), each electrical pin comprising:
a first portion positioned within the mating connector configured to electrically couple with hard drive connector pins positioned within the hard drive connector; and
an extended portion extending externally away from the mating connector, the extended portion having:
an attachment end configured to electrically couple the electrical pin to the PCB; and
a curved shape configured to reduce transmission of vibrations.

15. The hanging mounting system of claim 14, wherein an assembly formed of the carrier body, the one or more isolation hangers, and the hard disk drive is supportable in a sled only by way of:
a first isolation hanger of the one or more isolation hangers of the assembly in contact with a first drive divider of the one or more drive dividers positioned within the sled;
a second isolation hanger of the one or more isolation hangers of the assembly in contact with a second drive divider of the one or more drive dividers positioned within the sled; and
a physical coupling of the hard drive connector of the hard disk drive of the assembly with the flexible-mount electrical connection.

16. The hanging mounting system of claim 14, wherein the one or more drive dividers align a respective hard disk drive to a respective flexible-mount electrical connection.

17. The hanging mounting system of claim 14, wherein the flexible-mount electrical connection further comprises a pin separator positioned adjacently to the plurality of electrical pins and configured to prevent electrical contact between adjacent electrical pins of the plurality of electrical pins.

18. The hanging mounting system of claim 17, wherein the pin separator comprises a plurality of teeth, each tooth extending into a space between adjacent electrical pins of the plurality of electrical pins.

19. A connector assembly comprising:
coupling means for physically coupling with a hard drive connector; and
connecting means for suspending the coupling means over a void in a printed circuit board (PCB) and electrically connecting a hard drive to the PCB, wherein the connecting means comprises:
means for coupling the connecting means to a plurality of hard drive connector pins positioned within the hard drive connector; and
PCB coupling means for coupling the connecting means to contact pads of the PCB, the PCB coupling means comprises:
attachment means for electrically coupling the hard drive connector pins to the contact pads of the PCB; and
curve-shaped vibration reduction means for reducing vibration transmission between the hard drive and the PCB along each axis of a three-dimensional space to the attachment means.

20. A flexible-mount electrical connection comprising:
a mating connector configured to physically couple with a hard drive connector;
a plurality of electrical pins, each electrical pin having:
a connector portion positioned within the mating connector configured to electrically couple with hard drive connector pins positioned within the hard drive connector;
an extended portion extending externally away from the mating connector, wherein:
the extended portion has an attachment portion configured to electrically couple the electrical pin to a printed circuit board (PCB); and
the extended portion has a curved shape formed therein configured to reduce transmission of vibrations in the connector portion along each axis of a three-dimensional space to the attachment portion; and
a pin separator positioned adjacent to the plurality of electrical pins and configured to prevent electrical contact between adjacent electrical pins of the plurality of electrical pins, wherein:
the pin separator comprises a plurality of teeth;
each tooth comprises a pair of walls tapering from an end thereof toward a body of the pin separator; and
each tooth extends into a space between the adjacent electrical pins.

* * * * *